United States Patent [19]

Cope

[11] 4,094,069

[45] June 13, 1978

[54] DENTAL INSTRUMENT RETRACTION DEVICE

[76] Inventor: Raymond Cope, 3541 Springsvally Rd., Birmingham, Ala. 35223

[21] Appl. No.: 767,498

[22] Filed: Feb. 10, 1977

[51] Int. Cl.[2] .......... A61C 1/14

[52] U.S. Cl. .......... 32/22

[58] Field of Search .......... 32/22; 137/355.17, 355.18, 137/355.19, 355.21, 355.24, 355.2, 355.22, 355.23, 355.25

[56] References Cited

U.S. PATENT DOCUMENTS

| | | | |
|---|---|---|---|
| 2,131,297 | 9/1938 | Pieper | 32/22 |
| 3,493,009 | 2/1970 | Richardson | 137/355.17 |
| 3,972,120 | 8/1976 | Cope | 32/22 |

*Primary Examiner*—Russell R. Kinsey
*Assistant Examiner*—John J. Wilson

[57] ABSTRACT

In a preferred embodiment, a seating structure for a dental instrument, provided with a forward port for retractably receiving a dental instrument into the seat and provided with a rearward port for travel of an air tube connected operably to the dental instrument, has an open top with a minor overhang and with a narrowed width at the rearward port, and a forwardly mounted arched channel structure defining a through space of a height sufficient for travel of the air tube above the overhang, and including the air tube with a slidable retainer ring mounted thereon and axially adjustable to and fro to alternate positions as might be desired, with the retainer ring having a width greater than width of the open top adjacent the overhang but of a dimension sufficiently small to be retracted through the forward port into the seat beneath the overhang, the arched channel structure providing a guide track within which the tube may be flipped when the retainer ring is forward of the forward port, in orderto cause the retainer ring to become retracted onto a top of the overhang and rearwardly as the instrument is thereafter retracted into the seat.

3 Claims, 9 Drawing Figures

DENTAL INSTRUMENT RETRACTION DEVICE

This invention relates to a dental instrument retainer device for intermittently retaining an instrument and tube thereof in an extended state and thereafter returning the same to a retracted state.

BACKGROUND TO THE INVENTION

Prior to the present invention, the present inventor designed the retainer device in a manner substantially similar to the present inventive subject matter, except devoid of what has now been developed as a critical component to make the device operate without a substantial problem associated previously. In particular, while the mechanism of releasing an extended dental instrument and attached extended tube thereof from an extended state to thus permit retraction thereof, worked substantially by the same mechanism as the present invention, namely to pull forwardly to a further extended state and flip-upwardly the cord to cause the retainer ring to become instantly raised to a level during concurrent retraction as to ride on top of an overhang structure to a rearwardly direction and thus not be further retained, it was found that much too often when the dentist flipped the cord with a flip of the wrist, that the cord completely left the groove or slot of travel such that retraction pulled the instrument to a position outside of the retaining seat whereby the instrument was not in the retaining seat nor retained at all, but continued rearwardly if the instrument were released by the hand of the dentist or dental assistant. This caused considerable distraction and required time and care to assure that retraction was always proper and complete to an instrument-seated state.

SUMMARY OF THE INVENTION

Accordingly, the present invention is directed to the obtaining of an improved dental instrument and cord retraction device for overcoming problems and difficulties and disadvantages of the type discussed above, while obtaining concurrently novel advantages and mechanisms not heretofore known nor available.

Another object is to improve the simplicity and mechanism operativeness with which a dentist and/or dental assistant may return an extended instrument and tube thereof to a retracted state with a minimum of attention thereto, in order to avoid an undue break in concentration of the dentist and dental assistant in the operation procedure and care in behalf of the dental patient.

Other objects become apparent from the preceding and following disclosure.

One or more objects of the invention are obtained by the illustrated embodiments described hereinafter for purposes of improved understanding of the invention in its full scope not to be restricted to the illustrations given by way of mere example.

Broadly the invention may be defined as a combination which include an instrument seating structure with open top and forward and rearward ports through which the instrument air tube may be extended during extension and retraction of the instrument and tube thereof, with an overhang structure narrowing the open top such that the retainer structure mounted adjustably axially on the tube may ride forwardly or rearwardly on the overhang without permitting the retainer structure to fall into the slot except when pulled forwardly of the forward end portion of the overhang at the location of the forward port, upon which the retainer ring may be retracted beneath the overhang to a retainer barrier thus preventing further retraction of the instrument and tube until thereafter pulled forwardly and caused to be elevated upwardly to thereafter become retracted onto a top surface of the overhang structure, the improvement and invention being in the additional element in the nature of a through-passage structure having at least one side supporting wall, preferably two, with a top arch barrier-structure above the line of travel of the air tube, mounted in alignment with the forward port, with the top arch barrier-structure being located at a height sufficient to permit the tube to travel along a top surface of the overhang. The function of the through-passage structure is to act as an upward and downward-movement travel-guide for the tube when it is flipped upwardly after having first been pulled forwardly to move the retainer structure forward of the forward port — i.e. forward of a forward end of the overhang, such that upon the flip of the wrist of the hand holding the instrument, the tube may be thereby flipped upwardly while retraction pull withdraws the air tube and retainer structure mounted thereon, and the dental instrument to a retracted state — devoid of possibility of causing the tube from becoming dislodged from the normal path of retraction. The through-passage structure is preferably a frame having spaced-apart upright supports serving as guides, with an arched top structure preferably integral therewith as a total curved arch with a through-space defined thereby, mounted in close proximity to, i.e. in juxtaposition to, and in alignment with the forward port always. There is also preferably rearward of the overhang, adjacent the rearward port, an elevator structure in preferably the nature of a narrow groove-defining structure having a groove of sufficient width to receive the air tube, but narrowed sufficiently as to not receive the retainer structure, and the groove increasing from substantially zero depth to a depth equal to a height of an upper surface of the overhang, such that when the retracted tube is pulled to an advanced extended position, the retainer structure rides up the elevator structure onto the overhang.

The retainer structure is preferably an annular ring of a diameter slightly greater than that of the air tube such that the annular ring does not slip responsive to retraction pressure or force when the retainer ring is lodged against the barrier structure (retainer barrier) in the seat position when the tube is thereby retained in the extended state. However, with minimum additional force, the retainer ring is slidable to other desired positions adjustably intermittently, thereby enabling the dentist or dental assistant to alter the length of tube extended when held in the extended state.

THE FIGURES

Figure 3:
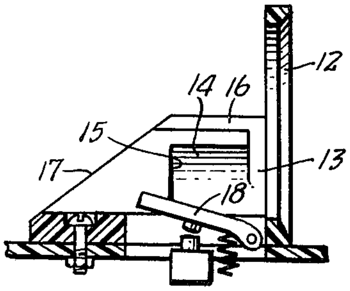
FIG. 3 illustrates a view in partial cross-section, as taken along line 3—3 of FIG. 2.
Figure 4:
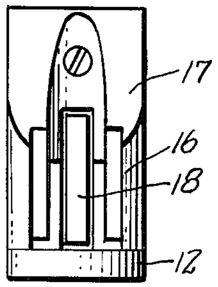
FIG. 4 illustrates an elevation plan view as taken along line 4—4 of FIG. 1.
Figure 5:
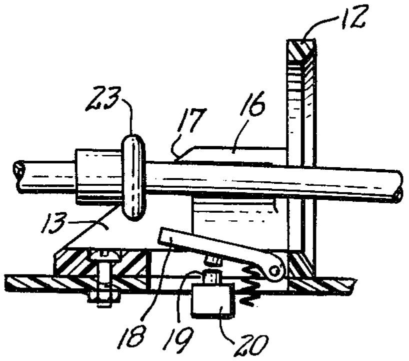
FIG. 5 illustrates a view in partial cross-section, as taken along line 5—5 of FIG. 1, with elevated retainer ring.
Figure 6:
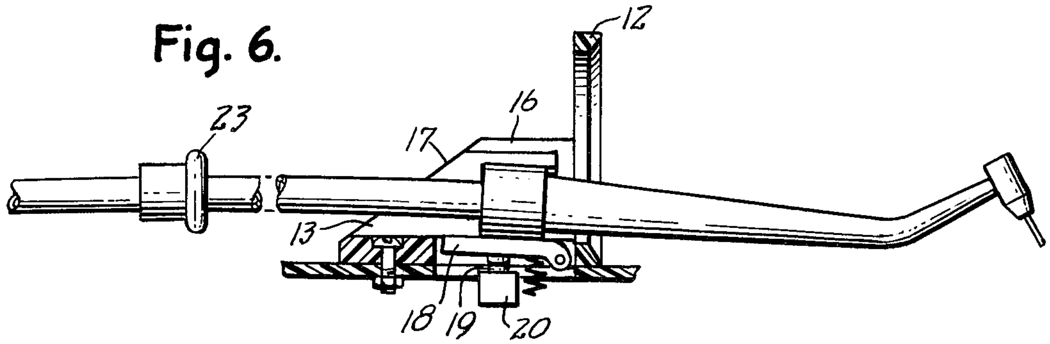
FIG. 6 illustrates a view in partial cross-section, comparable to the illustration of FIG. 3, except showing the dental instrument in a seated position.
Figure 7:
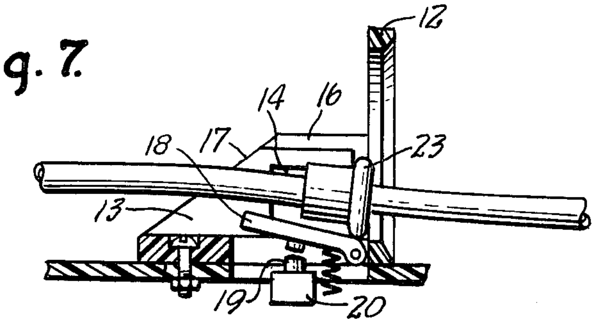

FIG. 7 illustrates in an in-part view, and in a view of partial cross-section again comparable to the illustration of FIGS. 3 and 5, the tube and retainer ring at about the through-passage structure and forwardly of the forward edge of the overhang, as would be the state during each of retraction toward a retainer ring-seated position, or of extension immediately prior to being flipped-upwardly to the phantom-illustrated position of FIG. 6.

Figure 8:
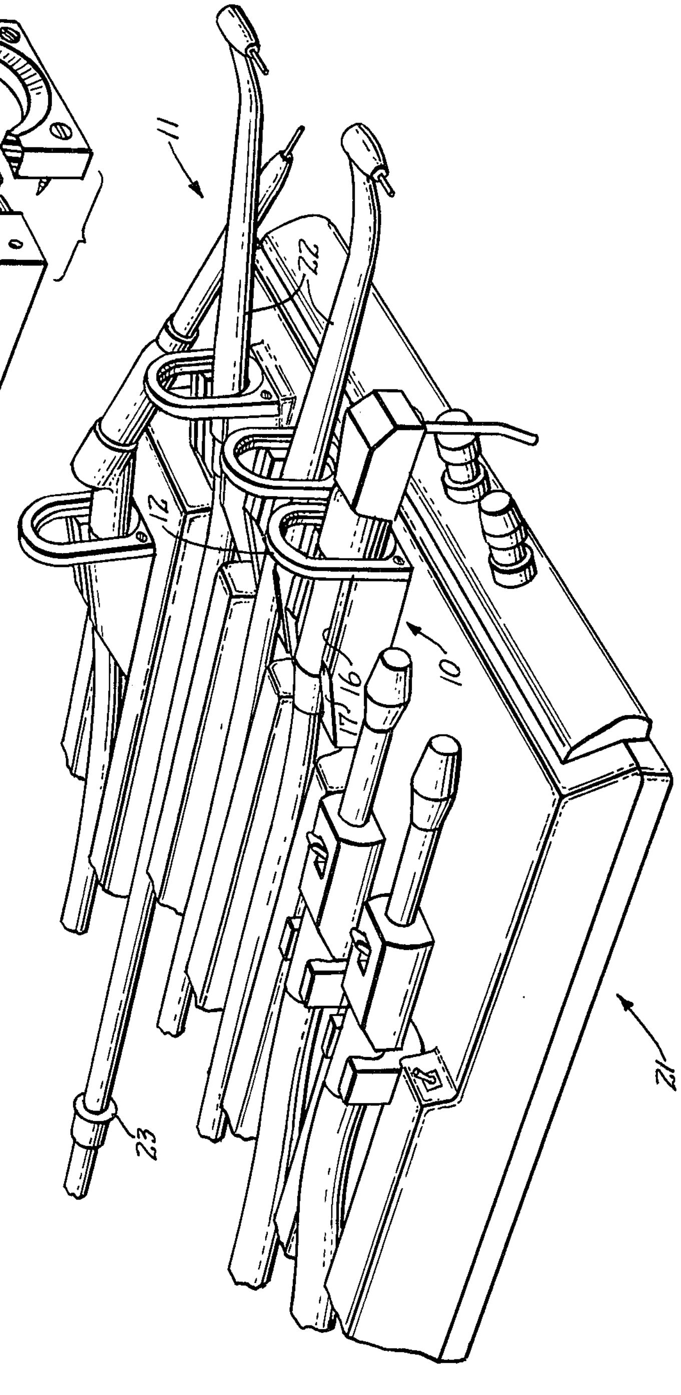

FIG. 8 illustrates in front perspective view several of the preferred devices of the present invention, in a mounted state and as a part of a typical and preferred combination with an instrument mounting and tube-retraction mechanism in which preferably retraction is effected by virtue of weight of a mass mounted on or otherwise attached to a rearward portion of the tube — such now being conventional and not a part of the present invention except as an overall part of a greater combination.

Figure 1:
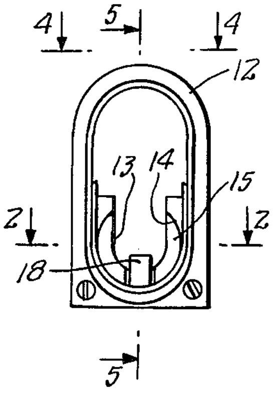
FIG. 1 illustrates a forward elevation view of the preferred device, in so far as the seating and retaining and through-passage structure is concerned.
Figure 2:
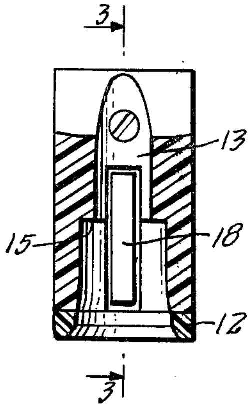
FIG. 2 illustrates a view in partial cross-section, as taken along line 2—2 of FIG. 1.
Figure 9:
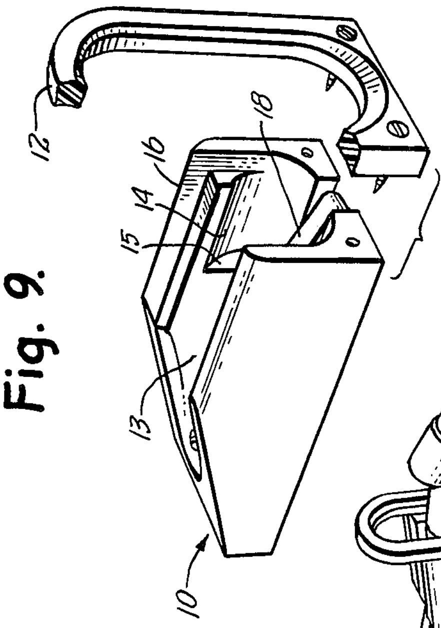

FIG. 9 illustrates a forward and side perspective view of the embodiment of FIG. 1, with partial cut-away for improved illustration.

DETAILED DESCRIPTION OF THE INVENTION

In greater detail, all Figures illustrate the same and common preferred embodiment of the present invention.

Accordingly, FIG. 9 is believed to be the best and most understandable view of the improved structure 10 as a total unit, devoid of the air tube and its retainer ring and devoid of the instrument, in this view. The device is shown in the mounted state in the FIG. 8 larger combination 11 of the entire tray and retraction mechanism, except for not showing the now conventional retraction mechanism of the weighted tube which causes the tube to slide rearwardly. Thereafter, in each of other Figures, one or more elements as follow may be seen. There is provided a seating space 13 defined between opposite side walls 14 having a retaining abutment 15, and having an overhang structure 16 extending from each of the side walls 14. Rearwardly of the rearward port to space 13 is located the groove-forming elevator structure 17 which includes an upper inclined surface along which a retainer ring is slidable to and fro. For purposes of initiating the instrument for its intended function, i.e. to turn it on, withdrawal of the instrument from its retracted and seated position removes its weight from the upwardly spring-biased switch lever 18 which when in the up position turns-on the air to the air hose by virtue of the air valve switch 20 having pressure button 19, for example, it being understood that such button and air-valve switch are given only by way of typical illustration, and that any desired or equivalent switch might be utilized.

The base portion 21 of the tray combination may be pivoted for upward and downward movement and for lateral to and fro movement also.

There may be a plurality of the inventive devices mounted side-by-side for different and/or alternative instruments 22.

As shown in each of FIGS. 5 through 8, the annular-ring retainer structure 23 is slidably-adjustably mounted on and around the air tube 24.

To utilize the inventive through-passage structure, which is broadly identified as arch element 12, the retainer ring has first been previously placed into the seating space 13 by pulling forwardly the air tube to an extended state at which the retainer ring (annular ring) retainer structure 23 has reached a point forward of the forward edge of the overhang structure 16 at which time the air tube and the retainer structure jointly fall into the forward port of the space 13, after which the air tube is permitted to retract until the retainer structure engages the retaining abutment 15. Now, from that state of retaining the air tube from further retraction, in order to cause the air tube to become retracted, the dentist or his assistant must again pull the air tube forwardly to a point anterior of the forward-most portion of the overhang structure 16, and simultaneously give the air tube — at a distant point adjacent or at the instrument, an upward flip or jerk and concurrently release holding or withdrawing pressure on the air tube, whereupon the tube at the arch element 12 is caused to move momentarily upwardly within the confines of the through-space circumscribed by the arch element and to become simultaneously retracted to a point on top of an upper surface of the overhang structure, whereby the air tube and the annular ring retainer structure mounted thereon continue to slide downwardly and rearwardly on the elevator structure 17 until the instrument becomes again seated within the space 13. Thereby, the arch element has served to retain the air tube in proper alignment and to facilitate proper retraction and seating of the instrument in a fully retracted state.

It additionally should be noted that alternate arrangements and structures were unsuccessfully attempted prior to the invention.

It is however within the scope of the invention to substitute equivalents and make modifications and variations within the skill of a person skilled in this art.

I claim:

1. A dental instrument retraction device comprising in combination: an elongated tubular recess structure forming a seat for alternately holding a body of an instrument and a tube anchored to a rearward portion of an instrument and the recess structure including bottom wall structure and side wall structures extending upwardly therefrom, and there being formed forward and rearward ports adjacent the seat and an open structure-free space above each of the seat and the forward and rearward ports, and there being formed an inwardly-directed retaining abutment substantially at said rearward port positioned and of a size such that a structure of a predetermined size larger than a cross-section of said tube anchored to a rearward portion of an instrument is prevented from further rearward retraction thereby providing for limiting rearward retraction of the anchored tube, and there being formed an inwardly-directed overhang from at least one of said side wall structures substantially above said seat and said forward and rearward ports, the inwardly-directed overhang being of a predetermined dimension sufficiently great to prevent dropping into said seat a structure of said predetermined size larger than said cross-section of said tube anchored to said rearward portion of said instrument and said overhang being limited to a maximum dimension such that the tube having said cross-section is enabled to drop into each of said seat and said forward and rearward ports, and said forward port being of a predetermined width at least as large as a width of said structure having said predetermined size such that the object is retractable rearwardly into the forward port beneath said overhang into said seat and held retainably against said retaining abutment; and a through-passage structure having at least one side support wall and an arch barrier-structure extending laterally from the side support wall, the barrier-structure extending above a through-space aligned with and in juxtaposition to said forward port, the barrier-structure being at a height above said overhang sufficient for travel of said tube of said cross-section substantially along an upper face of said overhang, and said through-space of said barrier-structure being of a width at least as large as said predetermined size, and the through-passage structure being mounted in fixed relationship relative to said recess structure; and said tube adapted to have a dental instrument operatively attached to a forward end thereof, the tube being of a tube cross-section sufficient for travel to and fro through each of said forward and rearward ports and downwardly past the overhang into said seat; and retainer structure mounted on said tube and being adapted for positioning at different alternate positions axially along said tube; the retainer structure having a width cross-section of said predetermined size larger than the cross-section of the tube such that when the tube is advanced axially forwardly the retainer structure rides on top of said overhang to a location forward thereof, and when thereafter the tube is retracted axially rearwardly the retainer structure may be directed upwardly by flipping the tube upwardly above said overhang, and alternately when the tube is not flipped during retraction thereof, the retainer structure is drawn through said forward port into said seat against said retaining abutment.

2. A dental instrument retraction device of claim 1, including an elevator structure forming a groove of increasing depth from rearward to forward directions and the groove having a width at least as large as said cross-section of said tube, ranging up to a dimension less than the width of said retainer structure, mounted rearward to and in juxtaposition to and in fixed relation relative to said rearward port and aligned therewith such that the retainer structure rides upwardly onto a top position onto said overhang when the tube and retainer structure are advanced forwardly from a rearward position to the elevator structure.

3. A dental instrument retraction device of claim 2, in which said barrier-structure is a continuous frame having two upright sides and a connecting overhead structure.

* * * * *